(12) United States Patent
Tsai et al.

(10) Patent No.: US 8,174,780 B1
(45) Date of Patent: May 8, 2012

(54) DISK DRIVE BIASING A REFRESH MONITOR WITH WRITE PARAMETER OF A WRITE OPERATION

(75) Inventors: Chun Sei Tsai, Tustin, CA (US); William B. Boyle, Lake Forest, CA (US); Michael S. Rothberg, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1190 days.

(21) Appl. No.: 11/769,447

(22) Filed: Jun. 27, 2007

(51) Int. Cl.
*G11B 27/36* (2006.01)
(52) U.S. Cl. ......................................................... 360/31
(58) Field of Classification Search .................. None
See application file for complete search history.

(56) References Cited

U.S. PATENT DOCUMENTS

| | | | |
|---|---|---|---|
| 4,642,715 A | 2/1987 | Ende | |
| 4,750,059 A | 6/1988 | Syracuse | |
| 4,949,036 A | 8/1990 | Bezinque et al. | |
| 5,487,077 A | 1/1996 | Hassner et al. | |
| 5,508,869 A * | 4/1996 | Nanjyo | 369/13.32 |
| 5,600,500 A | 2/1997 | Madsen et al. | |
| 5,651,131 A | 7/1997 | Chesley | |
| 5,682,273 A | 10/1997 | Hetzler | |
| 5,781,518 A | 7/1998 | Yamagami et al. | |
| 5,784,296 A | 7/1998 | Baker et al. | |
| 5,870,237 A | 2/1999 | Emo et al. | |
| 5,872,800 A | 2/1999 | Glover et al. | |
| 5,873,114 A | 2/1999 | Rahman et al. | |
| 5,909,334 A | 6/1999 | Barr et al. | |
| 5,923,485 A | 7/1999 | Ito | |
| 5,930,358 A | 7/1999 | Rao | |
| 5,941,998 A | 8/1999 | Tillson | |
| 5,970,507 A | 10/1999 | Kato et al. | |
| 6,052,804 A | 4/2000 | Thowe et al. | |
| 6,181,500 B1 | 1/2001 | Serrano et al. | |
| 6,266,199 B1 | 7/2001 | Gillis et al. | |
| 6,289,484 B1 | 9/2001 | Rothberg et al. | |
| 6,317,813 B1 | 11/2001 | Su et al. | |
| 6,317,850 B1 | 11/2001 | Rothberg | |
| 6,327,106 B1 | 12/2001 | Rothberg | |
| 6,359,744 B1 | 3/2002 | Mallary | |

(Continued)

FOREIGN PATENT DOCUMENTS

JP 10-255202 9/1998

OTHER PUBLICATIONS

Notice of Allowance dated Nov. 4, 2009 from U.S. Appl. No. 11/769,411, filed Jun. 27, 2007, 10 pages.

(Continued)

*Primary Examiner* — Thang Tran
*Assistant Examiner* — Huy D Nguyen

(57) ABSTRACT

A disk drive is disclosed including a disk, and a head actuated over the disk. Control circuitry within the disk drive is operable to receive a write operation for a refresh zone of the disk, measure a write operation quality parameter that affects the quality of the write operation, and perform the write operation. An update function is enabled in connection with performing the write operation, wherein the update function is operable to update a refresh monitor as a function of the write operation and the write operation quality parameter. Data stored in the refresh zone of the disk is refreshed in response to the refresh monitor.

14 Claims, 11 Drawing Sheets

U.S. PATENT DOCUMENTS

| | | | |
|---|---|---|---|
| 6,384,999 B1 | 5/2002 | Schibilla | |
| 6,393,511 B1 | 5/2002 | Albrecht et al. | |
| 6,426,909 B1 | 7/2002 | Tomita | |
| 6,429,984 B1 | 8/2002 | Alex | |
| 6,442,715 B1 | 8/2002 | Wilson | |
| 6,445,525 B1 | 9/2002 | Young | |
| 6,490,111 B1 | 12/2002 | Sacks | |
| 6,570,801 B2 | 5/2003 | Yoshida et al. | |
| 6,603,617 B1 | 8/2003 | Cross | |
| 6,606,211 B1 | 8/2003 | Lim et al. | |
| 6,628,466 B2 | 9/2003 | Alex | |
| 6,650,492 B2 | 11/2003 | Lenny et al. | |
| 6,661,597 B1 | 12/2003 | Codilian et al. | |
| 6,691,255 B1 | 2/2004 | Rothberg et al. | |
| 6,697,203 B1 | 2/2004 | Cheng et al. | |
| 6,697,992 B2 * | 2/2004 | Ito et al. | 714/763 |
| 6,714,368 B1 | 3/2004 | Himle et al. | |
| 6,747,827 B1 | 6/2004 | Bassett et al. | |
| 6,781,780 B1 | 8/2004 | Codilian | |
| 6,791,775 B2 | 9/2004 | Li et al. | |
| 6,798,591 B2 | 9/2004 | Barnett et al. | |
| 6,809,893 B2 | 10/2004 | Uzumaki et al. | |
| 6,826,007 B1 | 11/2004 | Patton, III | |
| 6,854,022 B1 | 2/2005 | Thelin | |
| 6,854,071 B2 | 2/2005 | King et al. | |
| 6,862,022 B2 * | 3/2005 | Slupe | 345/207 |
| 6,862,505 B2 | 3/2005 | Satoh et al. | |
| 6,892,249 B1 | 5/2005 | Codilian et al. | |
| 6,895,500 B1 | 5/2005 | Rothberg | |
| 6,898,033 B2 | 5/2005 | Weinstein et al. | |
| 6,947,234 B2 | 9/2005 | Lamberts et al. | |
| 6,948,102 B2 | 9/2005 | Smith | |
| 6,950,967 B1 | 9/2005 | Brunnett et al. | |
| 6,980,386 B2 | 12/2005 | Wach et al. | |
| 6,982,842 B2 | 1/2006 | Jing et al. | |
| 6,987,630 B1 | 1/2006 | Higgins et al. | |
| 6,995,933 B1 | 2/2006 | Codilian et al. | |
| 7,006,321 B2 | 2/2006 | Kisaka | |
| 7,023,645 B1 | 4/2006 | Emo et al. | |
| 7,024,614 B1 | 4/2006 | Thelin et al. | |
| 7,032,127 B1 | 4/2006 | Egan et al. | |
| 7,043,598 B2 | 5/2006 | Wu et al. | |
| 7,050,252 B1 | 5/2006 | Vallis | |
| 7,076,604 B1 | 7/2006 | Thelin | |
| 7,082,494 B1 | 7/2006 | Thelin et al. | |
| 7,102,838 B2 | 9/2006 | Kim et al. | |
| 7,120,737 B1 | 10/2006 | Thelin | |
| 7,143,203 B1 | 11/2006 | Altmejd | |
| 7,143,309 B2 | 11/2006 | Yoshida | |
| 7,149,046 B1 | 12/2006 | Coker et al. | |
| 7,173,782 B2 | 2/2007 | Ikeda et al. | |
| 7,177,979 B2 | 2/2007 | Kuwamura | |
| 7,227,708 B2 | 6/2007 | Feng | |
| 7,345,837 B1 | 3/2008 | Schreck et al. | |
| 7,362,532 B2 * | 4/2008 | Iwama | 360/69 |
| 7,405,893 B2 | 7/2008 | Bi et al. | |
| 7,477,465 B2 | 1/2009 | Yu | |
| 7,606,129 B2 * | 10/2009 | Urata et al. | 369/53.2 |
| 7,672,072 B1 * | 3/2010 | Boyle et al. | 360/31 |
| 7,872,822 B1 | 1/2011 | Rothberg | |
| 2001/0043424 A1 | 11/2001 | Nguyen | |
| 2003/0007269 A1 | 1/2003 | Alex | |
| 2003/0016215 A1 * | 1/2003 | Slupe | 345/213 |
| 2003/0016461 A1 | 1/2003 | Seng et al. | |
| 2004/0153949 A1 | 8/2004 | Ro et al. | |
| 2004/0174627 A1 | 9/2004 | Kim et al. | |
| 2004/0252397 A1 | 12/2004 | Hodge et al. | |
| 2004/0264028 A1 | 12/2004 | Ishii et al. | |
| 2004/0268033 A1 | 12/2004 | Chia et al. | |
| 2005/0036437 A1 | 2/2005 | Learned et al. | |
| 2005/0063084 A1 * | 3/2005 | Fujiwara et al. | 360/46 |
| 2005/0078393 A1 | 4/2005 | Cho | |
| 2005/0146803 A1 | 7/2005 | Kim et al. | |
| 2005/0180267 A1 | 8/2005 | Jeong et al. | |
| 2005/0188153 A1 | 8/2005 | Yun et al. | |
| 2005/0207049 A1 | 9/2005 | Ikeda et al. | |
| 2006/0066971 A1 | 3/2006 | Alex et al. | |
| 2006/0098318 A1 | 5/2006 | Feng | |
| 2006/0101197 A1 | 5/2006 | Georgis et al. | |
| 2006/0132954 A1 | 6/2006 | Wada et al. | |
| 2006/0198041 A1 | 9/2006 | Kuwamura | |
| 2006/0245102 A1 * | 11/2006 | Cheng | 360/53 |
| 2007/0076315 A1 | 4/2007 | McMurtrey | |
| 2007/0277011 A1 | 11/2007 | Tanaka et al. | |

OTHER PUBLICATIONS

Office Action dated Jun. 1, 2009, from U.S. Appl. No. 11/769,411, 32 pages.

* cited by examiner

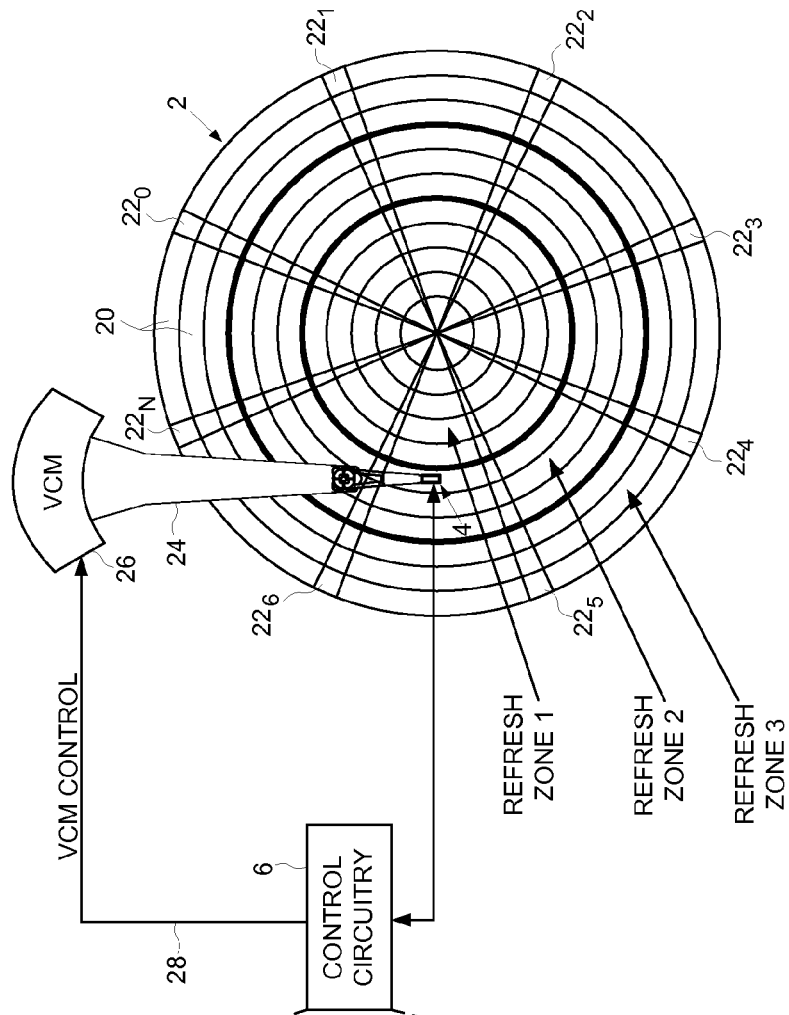
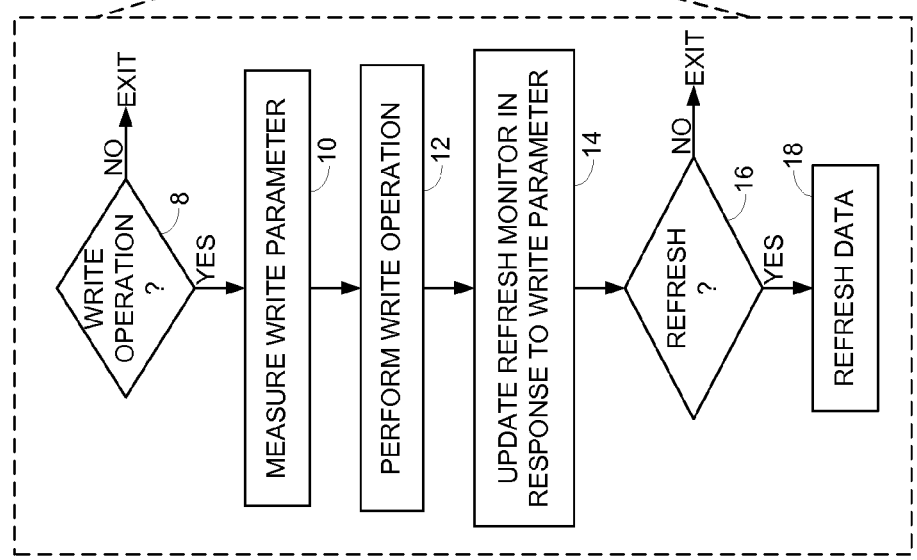

DISK DRIVE BIASING A REFRESH MONITOR WITH WRITE PARAMETER OF A WRITE OPERATION

RELATED APPLICATIONS

This application is related to co-pending U.S. patent application titled "DISK DRIVE MODIFYING AN UPDATE FUNCTION FOR A REFRESH MONITOR IN RESPONSE TO A MEASURED DURATION", Ser. No. 11/769,411, filed on the same day as the present application and incorporated herein by reference.

BACKGROUND

1. Field

The present invention relates to disk drive for computer systems. In particular, the present invention relates to a disk drive biasing a refresh monitor with a write parameter of a write operation.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

To protect against catastrophic data loss due to magnetic entropy, the prior art has suggested to maintain refresh monitors for periodically refreshing data (reading and rewriting data) so as to periodically realign the magnetic orientation of the grains. The prior art has also suggested to bias the refresh monitors based on operating parameters. For example, as the ambient temperature increases, the refresh monitor is biased to trigger sooner so that the data is refreshed sooner. However, the prior art techniques for biasing the refresh monitors do not take into account the effect that certain write parameters have on magnetic entropy during write operations.

There is, therefore, a need to improve the refresh monitor for a disk drive by accounting for write parameters that may precipitate magnetic entropy during a write operation.

SUMMARY OF THE EMBODIMENTS OF THE INVENTION

An embodiment of the present invention comprises a disk drive including a disk, and a head actuated over the disk. Control circuitry within the disk drive is operable to receive a write operation for a refresh zone of the disk, measure a write operation quality parameter that affects the quality of the write operation, and perform the write operation. An update function is enabled in connection with performing the write operation, wherein the update function is operable to update a refresh monitor as a function of the write operation and the write operation quality parameter. Data stored in the refresh zone of the disk is refreshed in response to the refresh monitor.

In one embodiment, the write operation quality parameter comprises an ambient temperature. In another embodiment, the write operation quality parameter comprises at least one of an ambient temperature, altitude, a fly-height heater parameter, a write current amplitude, a write current overshoot, a skew angle of the head, a width of the head, a data density of data recorded on the disk, and a servo parameter.

In another embodiment, the control circuitry is further operable to measure a plurality of write operation quality parameters that affect the quality of the write operation, and the update function is operable to update the refresh monitor as a function of the write operation and the plurality of write operation quality parameters.

In yet another embodiment, the update function is operable to update the refresh monitor as a function of the write operation, the write operation quality parameter, and a duration of the data stored in the refresh zone. In one embodiment, the update function is further operable to update the refresh monitor as a function of an ambient temperature over the duration of the data stored in the refresh zone. In another embodiment, the write operation quality parameter comprises an ambient temperature at the time of the write operation, and the update function is further operable to update the refresh monitor as a function of an ambient temperature over the duration of the data stored in the refresh zone.

Another embodiment of the present invention comprises a method of operating a disk drive, the disk drive comprising a disk, and a head actuated over the disk. A write operation is received for a refresh zone of the disk, a write operation quality parameter that affects the quality of the write operation is measured, and the write operation is performed. An update function in connection with performing the write operation is enabled, wherein the update function is operable to update a refresh monitor as a function of the write operation and the write operation quality parameter. Data stored in the refresh zone of the disk is refreshed in response to the refresh monitor.

Another embodiment of the present invention comprises a disk drive including a disk, and a head actuated over the disk. Control circuitry within the disk drive is operable to maintain a refresh monitor for data written to the disk. The data is refreshed in response to the refresh monitor, and a write operation quality parameter that affects the quality of the refresh operation is measured. The refresh monitor is initialized in response to the write operation quality parameter.

BRIEF DESCRIPTION OF THE DRAWINGS

FIG. 1A shows a disk drive according to an embodiment of the present invention including a disk, a head actuated over the disk, and control circuitry for performing a refresh operation on data stored on the disk.

FIG. 1B is a flow diagram executed by the control circuitry for measuring a write operation quality parameter during a write operation for use in updating a refresh monitor.

DETAILED DESCRIPTION OF EMBODIMENTS OF THE INVENTION

Figure 2A:
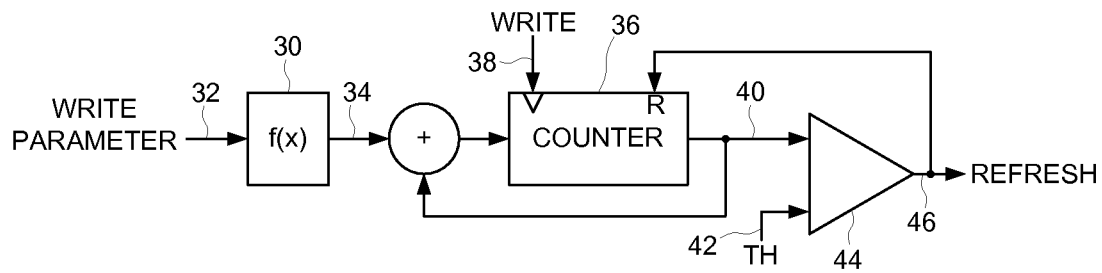
FIG. 2A shows a refresh monitor according to an embodiment of the present invention, wherein an update function is responsive to the write operation quality parameter.

FIG. 1A shows a disk drive according to an embodiment of the present invention including a disk 2, and a head 4 actuated over the disk 2. Control circuitry 6 within the disk drive is operable to execute the flow diagram of FIG. 1B, wherein if at step 8 the disk drive receives a write operation for a refresh zone of the disk 2, the control circuitry 6 measures a write operation quality parameter that affects the quality of the write operation at step 10, and performs the write operation at step 12. At step 14 an update function is enabled in connection with performing the write operation, wherein the update function is operable to update a refresh monitor as a function of the write operation and the write operation quality parameter. If at step 16 the refresh monitor indicates a refresh operation should be performed, at step 18 the data stored in the refresh zone of the disk is refreshed in response to the refresh monitor.

Biasing the refresh monitor in response to a write operation quality parameter helps to account for the precipitous affect that write operations can have on magnetic entropy. For example, when writing data to a target track at high ambient temperatures, the degrading effect of the fringe field on the adjacent tracks is pronounced since the coercivity of the disk surface decreases at higher temperatures. Also, when writing data to a target track at low ambient temperatures, the quality of the write operation to the target track may be affected by the higher coercivity of the media.

In the embodiment of FIG. 1A, the disk 2 comprises a plurality of embedded servo sectors $22_0$-$22_N$ that define a plurality of data tracks 20. The head 4 is connected to a distal end of an actuator arm 24 which is rotated about a pivot by a voice coil motor (VCM) 26 in order to actuate the head 4 radially over the disk 2. The control circuitry 6 processes the read signal emanating from the head 4 to demodulate the information in the embedded servo sectors. The demodulated servo information (position error signal) is then processed (e.g., using appropriate compensation filtering) to generate a position control signal 28 applied to the VCM 26 in order to position the head 4 over a target data track (seek to the target data track and track the centerline of the target data track). In one embodiment, each data track is partitioned into a number of data sectors, wherein write/read operations are performed on one or more data sectors at a time.

FIG. 1A also shows in one embodiment that the data tracks 20 are banded together into a plurality of refresh zones from the inner to outer diameter of the disk. However, the refresh zones may be defined in any suitable manner, including to define the refresh zone relative to logical block addresses or physical block addresses. In one embodiment, the refresh zones may extend across multiple disk surfaces.

FIG. 2A shows a refresh monitor that may be implemented by control circuitry 6 according to an embodiment of the present invention comprising an update function f(x) 30 responsive to a write operation quality parameter 32. The update function f(x) 30 outputs a value 34 that is accumulated by a counter 36 when enabled (clocked) by a write signal 38 at each write operation. The output 40 of the counter 36 is compared to a threshold 42 at comparator 44, wherein a refresh signal 46 is activated when the counter output 40 exceeds the threshold 42. The refresh signal 46 may initiate a refresh operation for the corresponding refresh zone and reset the counter 36.

Figure 2B:
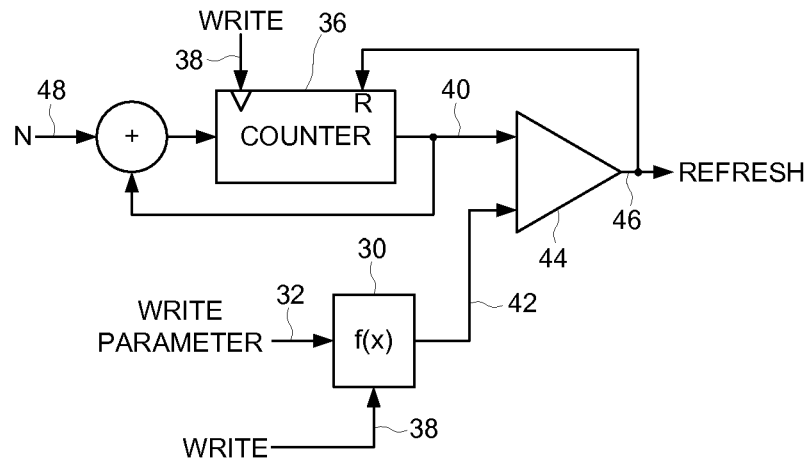
FIG. 2B shows an alternative embodiment for the refresh monitor.
Figure 2C:
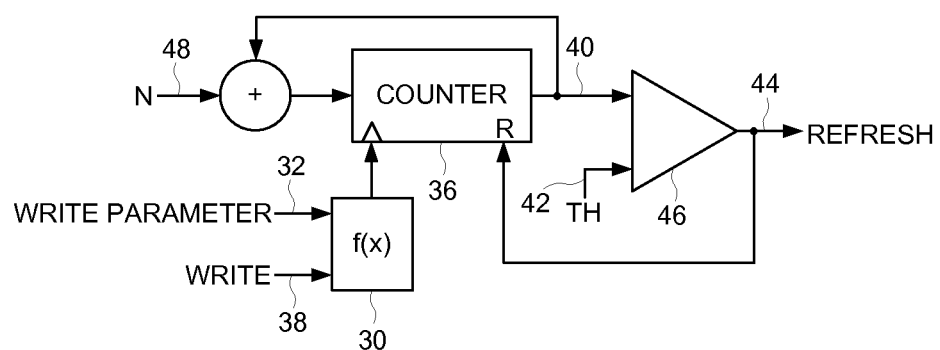
FIG. 2C shows another embodiment for the refresh monitor.

The refresh monitor may be implemented in any suitable manner in the embodiments of the present invention. FIG. 2B shows an alternative embodiment of the refresh monitor wherein the counter 36 accumulates a constant value N 48, and the update function 30 generates the threshold 42 for comparing to the output 40 of the counter 36. The update function 30 adjusts the threshold 42 in response to the write operation quality parameter 32, for example, by decreasing the threshold as the ambient temperature increases during write operations. In this embodiment, the update function 30 is enabled to adjust the threshold 42 in connection with write operations (enabled by the write signal 38). In yet another embodiment shown in FIG. 2C, the clock frequency of the counter is adjusted by the update function 30. For example, the clock frequency is increased as the ambient temperature increases during write operations so that the refresh signal 46 is triggered sooner.

Figure 3:
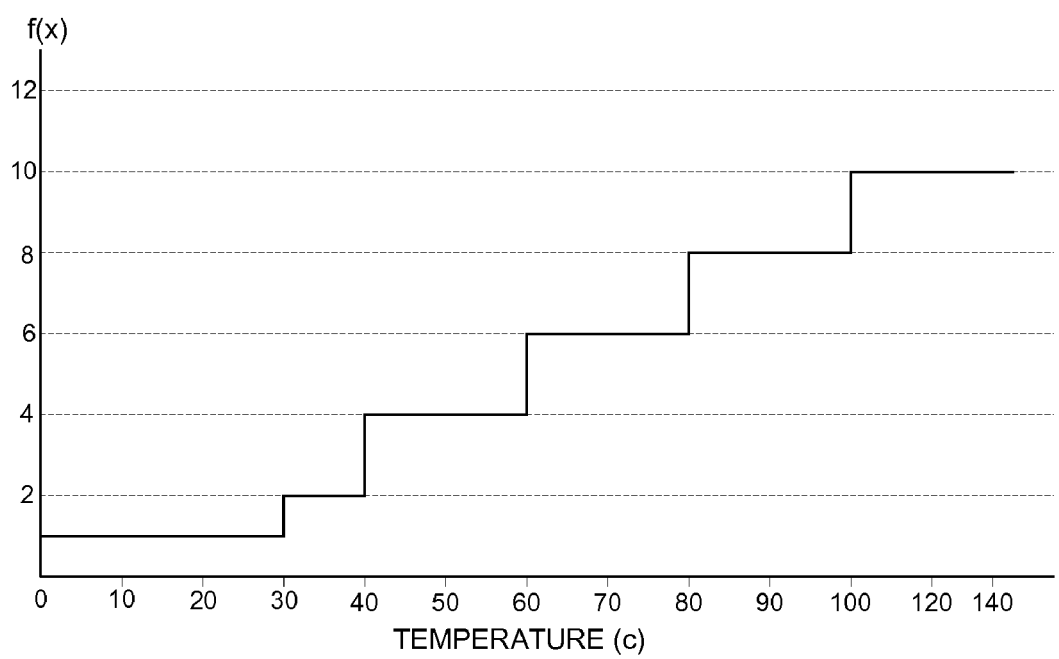
FIG. 3 shows an example update function responsive to an ambient temperature measured during a write operation.

FIG. 3 shows an example update function responsive to an ambient temperature measured during a write operation. At low ambient temperatures, the update function outputs a small value (e.g., one) for accumulation by the counter 36. As the ambient temperature increases, the update function outputs a corresponding larger value for accumulation by the counter 36 so that the refresh monitor triggers sooner if the ambient temperature is increasing during write operations. In an alternative embodiment, the update function response shown in FIG. 3 may be shaped like a V, such that the update function outputs large values at very low and very high temperatures, with gradually decreasing output values as the temperature approaches the middle.

The update function may be responsive to any suitable write operation quality parameter, such as an ambient temperature, an altitude, a fly-height heater parameter, a write current amplitude, a write current overshoot, a skew angle of the head, a width of the head, a data density of data recorded on the disk, and a servo parameter. The ambient temperature may be measured once for the entire disk drive, or it may be measured locally for each head for each disk surface in the disk drive. In one embodiment, the disk drive comprises a dynamic fly height heater for heating the head in order to adjust the fly-height, wherein the write operation quality parameter comprises a heater setting, such as a current applied to the heater. In the embodiment wherein the write operation quality parameter comprises a write current overshoot, the parameter setting may comprise a magnitude or duration of write current overshoot applied to the head. The skew angle of the head is a function of the offset between the reader and writer element, as well as the radial position of the head over the disk, and the width of the head (width of the write element) may be measured using any suitable conventional technique. The data density of the disk may be in the radial direction (number of tracks per inch), or the linear direction (number of bits per inch) which may vary across the radius of the disk. The servo parameter may include any suitable parameter that affects the quality of servo operations, including seeking to a target data track or tracking a centerline of the target data track during write operations. The servo parameter may include, for example, the seek profile, the time to settle on the target data track, the average position error signal while tracking the centerline of the target data track, or a repeatable runout parameter computed prior to tracking. The repeatable runout parameter accounts for eccentricity of the disk and may change over time as the disk expands, or if the disk slips due to a physical shock to the disk drive.

Figure 4:
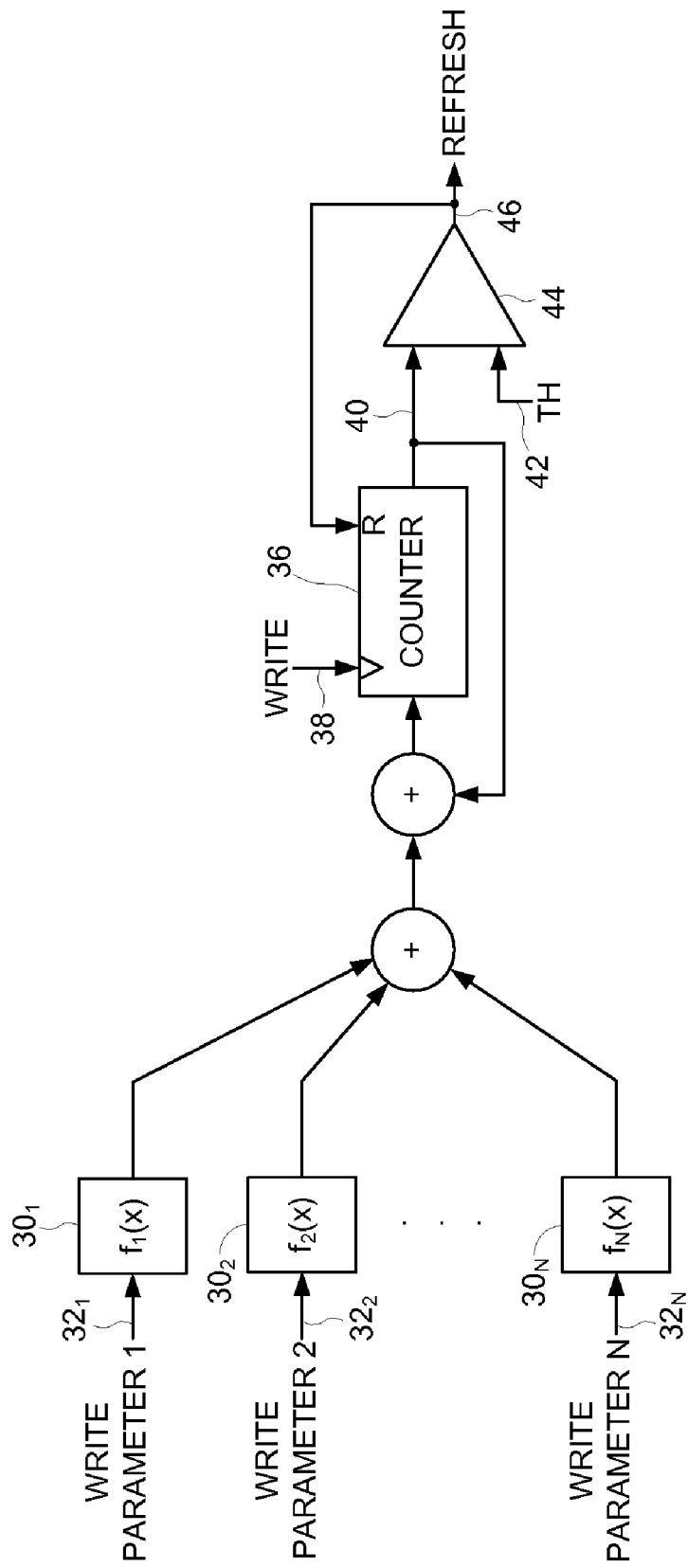
FIG. 4 shows an embodiment of the present invention wherein the update function is operable to update the refresh monitor as a function of a plurality of write operation quality parameters.

FIG. 4 shows an embodiment of the present invention wherein the control circuitry 6 is further operable to measure a plurality of write operation quality parameters that affect the quality of the write operation, and the update function (or update functions $f(x)_1$-$f(x)_N$ 30$_1$-30$_N$) is operable to update the refresh monitor as a function of the write operation and the plurality of write operation quality parameters 32$_1$-32$_N$. Any suitable plurality of write operation quality parameters many be employed, such as two or more of the parameters described above.

Figure 5A:
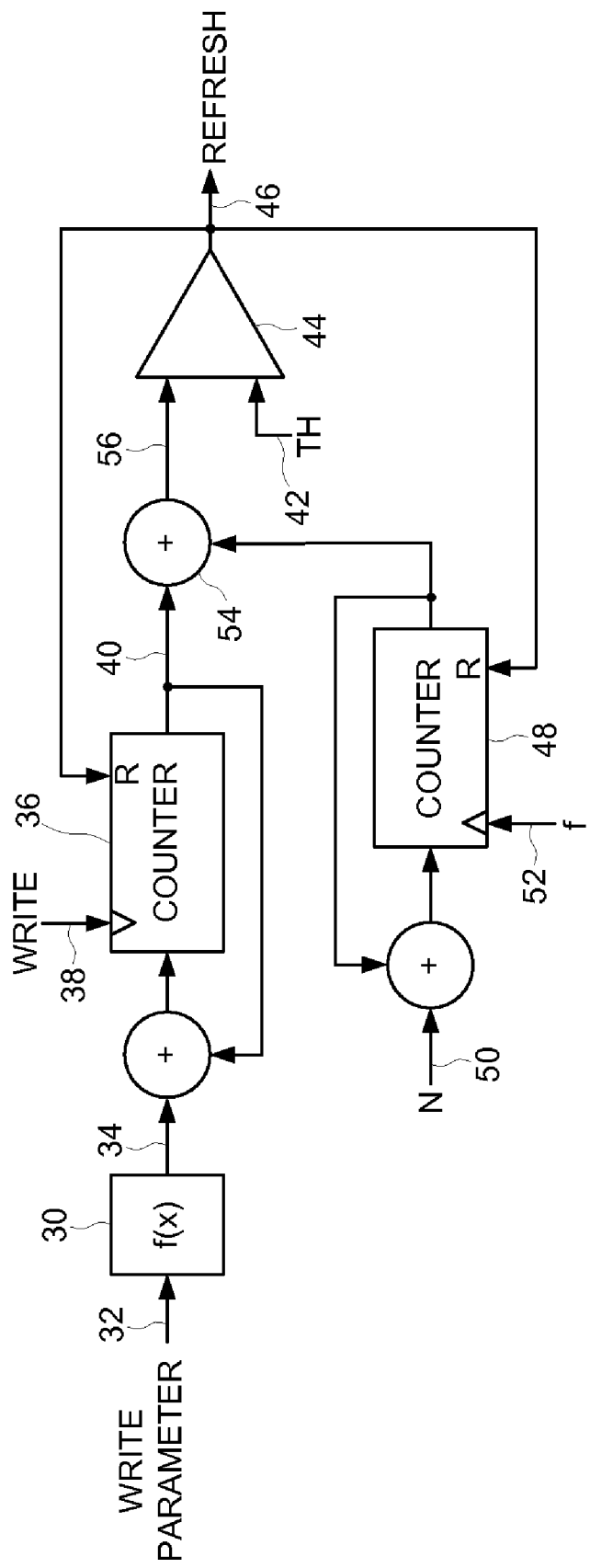
FIG. 5A shows an embodiment of the present invention wherein the update function is operable to update the refresh monitor as a function of a duration of the data stored in the refresh zone.

FIG. 5A shows an embodiment of the present invention that may be implemented by control circuitry 6, wherein the update function is operable to update the refresh monitor as a function of the write operation, the write operation quality parameter, and a duration of the data stored in the refresh zone. In the embodiment shown, a counter 48 accumulates a constant value N 50 at a frequency f set by a frequency signal 52. The output of counters 36 and 48 are combined at adder 54, and the output 56 compared to the threshold 42. Both counters 36 and 48 may be reset by refresh signal 46 after performing the refresh operation.

Figure 5B:
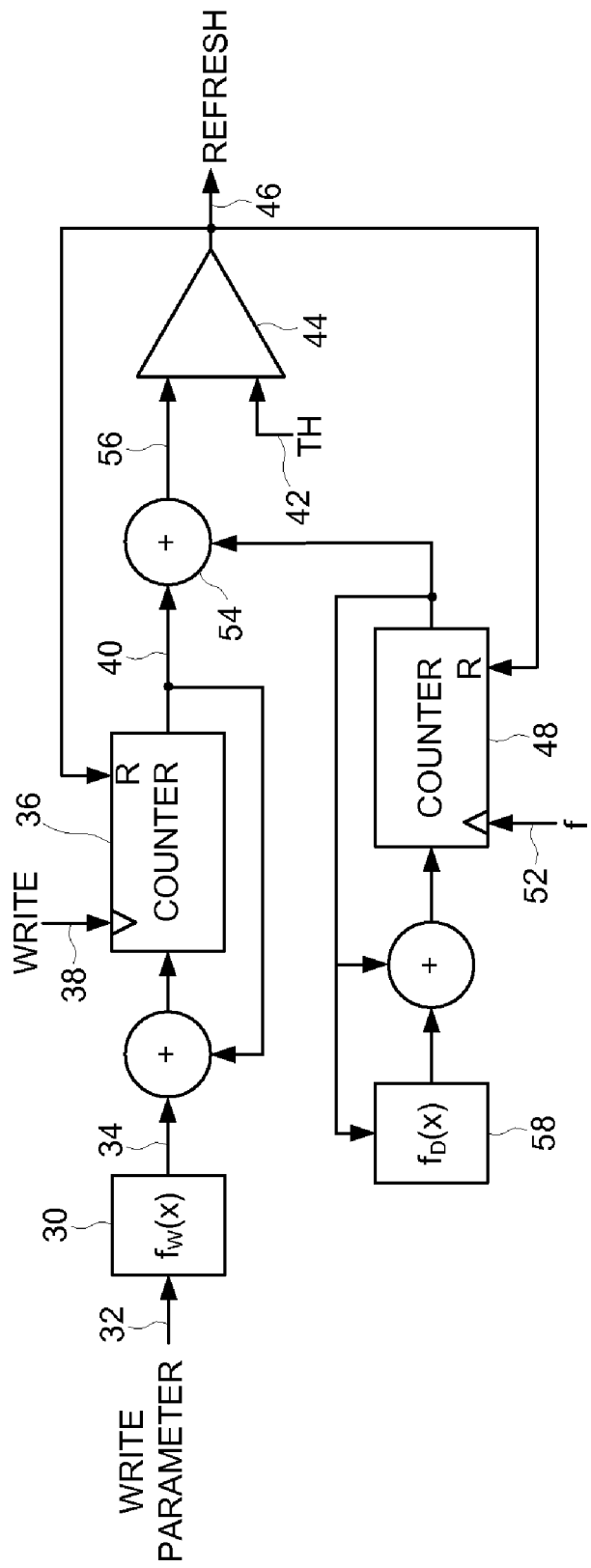
FIG. 5B shows an embodiment of the present invention wherein the function of duration is more complex than first order.

FIG. 5B shows another embodiment of the present invention wherein the duration function $f_D(x)$ 58 of the data stored in the refresh zone is more complex than a first order function. The duration function 58 outputs an accumulated value that is a function of the accumulated duration (i.e., the output of the counter 48). For example, in one embodiment the duration function is of the form $C_D N$ where $C_D$ is a coefficient that increases over time (increases with the output of counter 48). This embodiment may better model how magnetic entropy actually occurs in the disk drive over time.

Figure 6A:
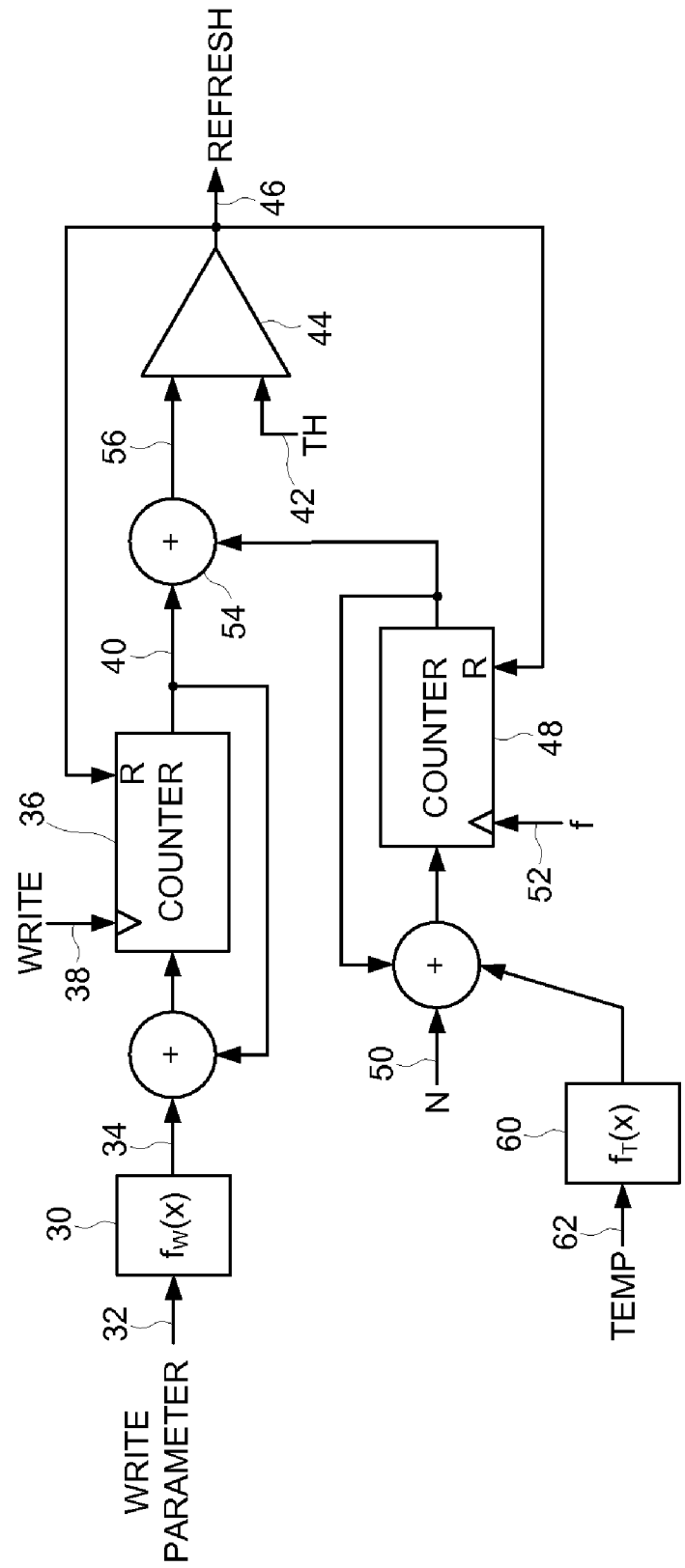
FIG. 6A shows an embodiment of the present invention wherein the update function is operable to update the refresh monitor as a function of an ambient temperature over the duration of the data stored in the refresh zone.

FIG. 6A shows an embodiment of the present invention that may be implemented by control circuitry 6, wherein the update function comprises a write operation function $f_W(x)$ 30 responsive to the write operation quality parameter 32, and an ambient temperature function $f_T(x)$ 60 responsive to an ambient temperature 62. In this embodiment, the update function updates the refresh monitor as a function of the ambient temperature 62 over the duration of the data stored in the refresh zone. Any suitable update function may be employed, wherein in the embodiment shown in FIG. 6A, the output of the second function $f_T(x)$ 60 is added to the constant value 50, and then accumulated by counter 48. In one embodiment, the second function $f_T(x)$ 60 is a first order function of the form $C_T T$, where $C_T$ is a coefficient and T is the ambient temperature. In another embodiment, the write operation quality parameter 32 comprises the ambient temperature at the time of the write operations.

Figure 6B:
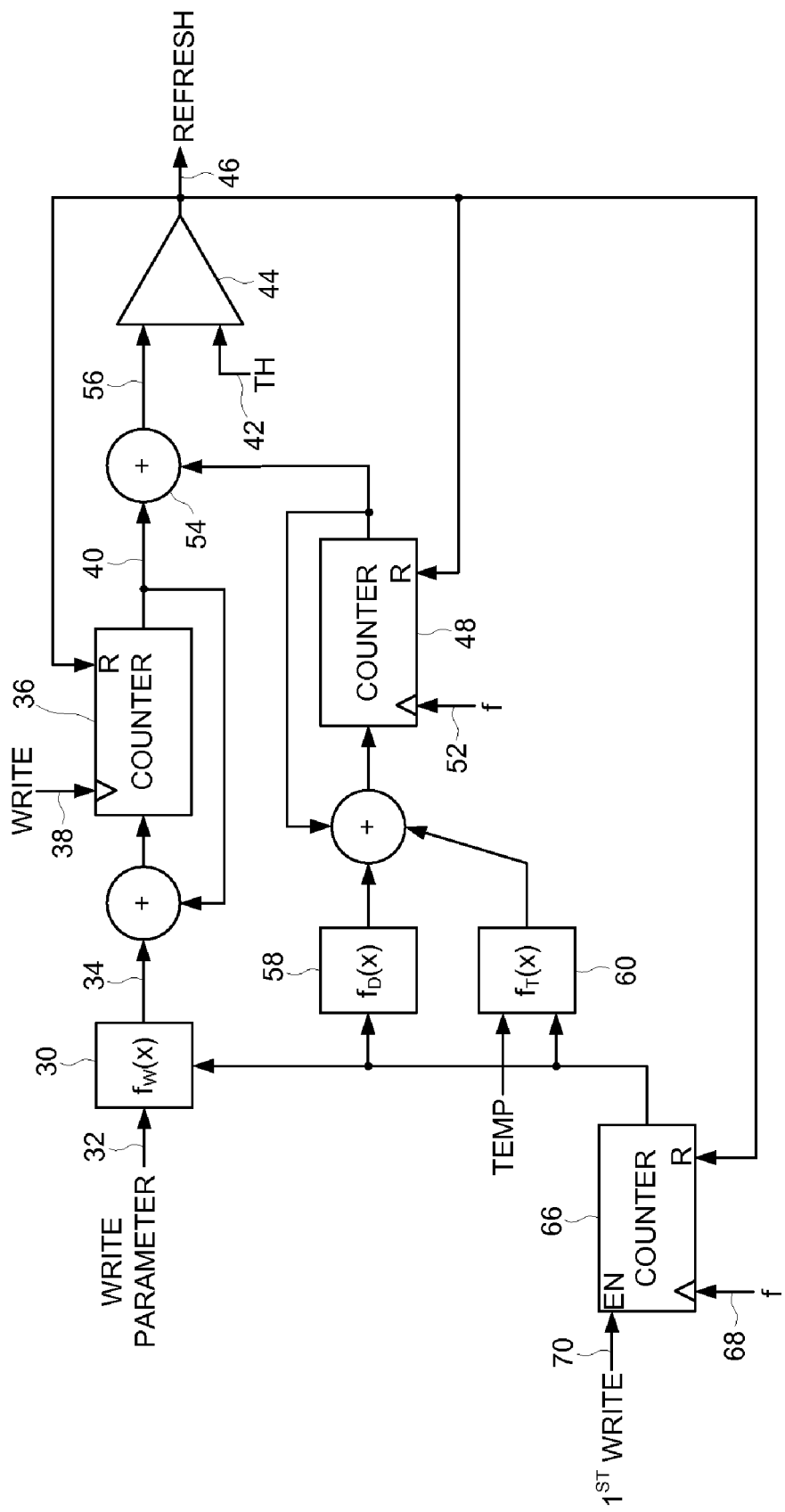
FIG. 6B shows an embodiment of the present invention wherein the ambient temperature function is modified by the duration that the data is stored in the refresh zone.
Figure 6C:
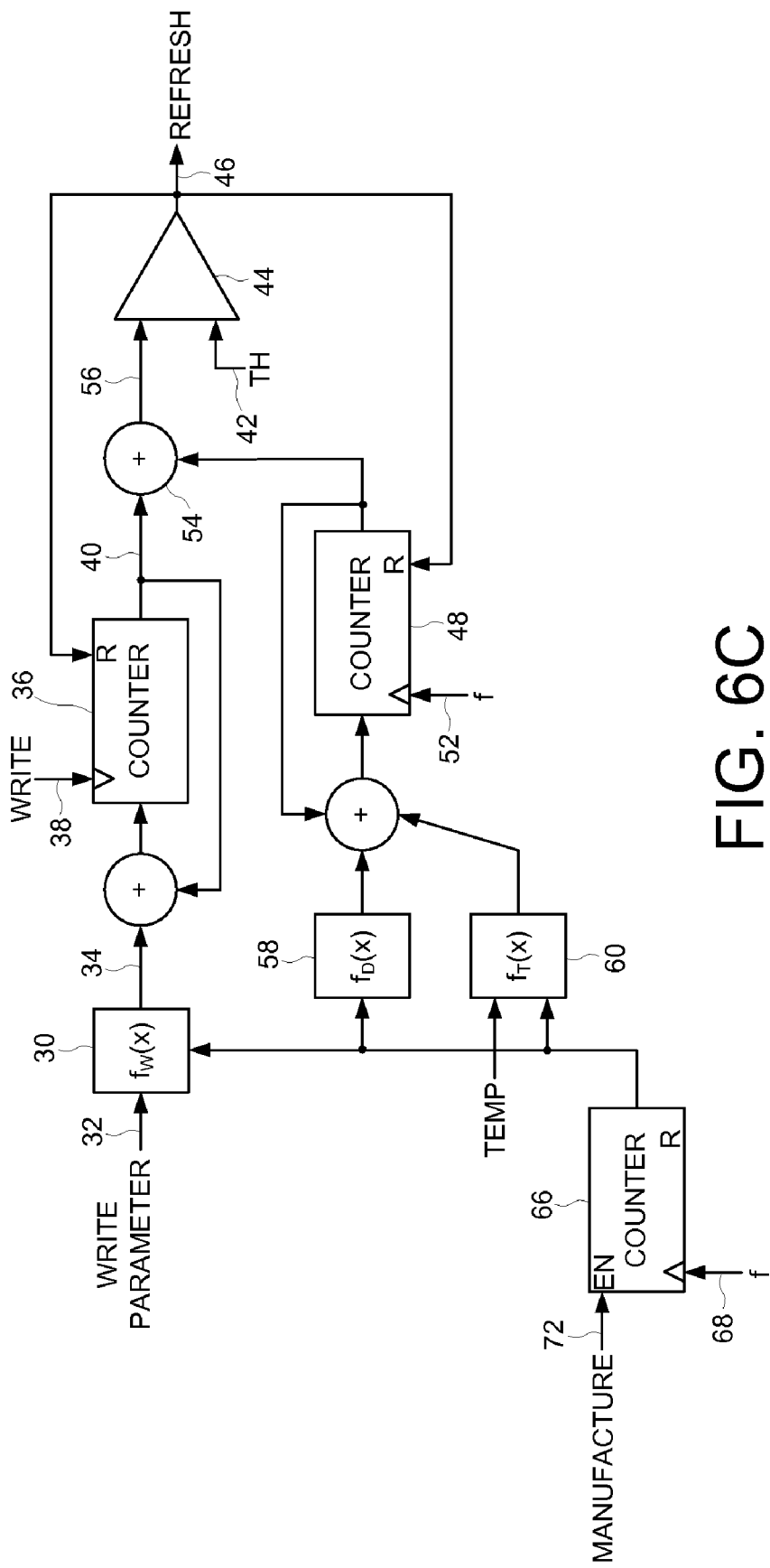
FIG. 6C shows an embodiment of the present invention wherein the ambient temperature function is modified by the lifetime duration of the disk drive.

In an alternative embodiment shown in FIG. 6B, a counter 66 tracks the duration of the data stored in the refresh zone. The counter 66 is enabled by the first write operation 70 to the refresh zone (or after a refresh is performed on the zone) and clocked at a predetermined frequency 68. The counter 66 is reset by the refresh signal 46 after performing a refresh of the data stored in the refresh zone. The output of the counter 66 is used to modify the write operation function $f_W(x)$ 30, and/or the duration function $f_D(x)$ 58, and/or the ambient temperature function $f_T(x)$ 60. For example, one or more of the functions may be biased to increase the output as the duration of the recorded data increases. FIG. 6C shows a similar embodiment wherein the counter 66 tracks the lifetime duration of the disk drive after manufacturing. That is, the counter 66 is enabled at some point after manufacturing (by manufacture signal 72), and then clocked at a suitable frequency 68 so that the output of the counter 66 represents the lifetime duration of the disk drive. As with the embodiment of FIG. 6B, one or more of the functions 30, 58, and 60 may be biased to increase the output as the lifetime duration of the disk drive increases. In one embodiment, one or more of the functions 30, 58, and 60 may be biased in response to both the duration of the recorded data as well as the lifetime duration of the disk drive.

In the embodiments of FIGS. 6B and 6C, a suitable technique is employed to track the duration of the recorded data and/or the lifetime duration of the disk drive while the disk drive is powered down. For example, a rechargeable battery may power timing circuitry while the disk drive is powered down, or the disk drive may obtain suitable timing information (e.g., date information) from a host each time the disk drive is powered on.

Figure 7:
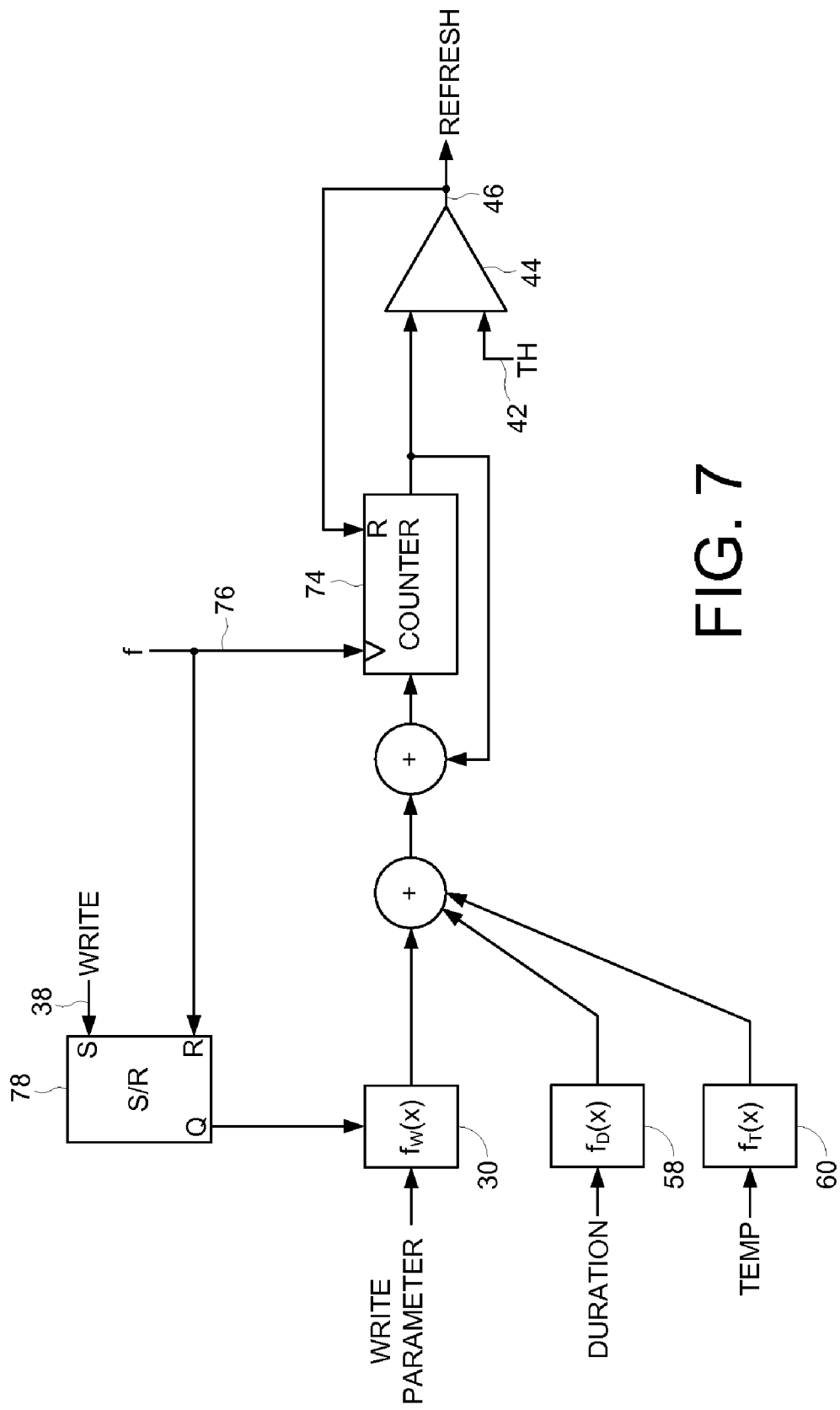
FIG. 7 shows an alternative embodiment of the update function enabled by a write operation.

FIG. 7 shows another embodiment of the refresh monitor that may be implemented by control circuitry 6, wherein a counter 74 is clocked by a predetermined frequency signal 76, and an S/R register 78 enables the update function $f_W(x)$ 30 in response to the write signal 38. The frequency signal 76 resets the S/R register 78 so that only one output of the update function $f_W(x)$ 30 is accumulated by the counter 74 for each write operation.

Figure 8:
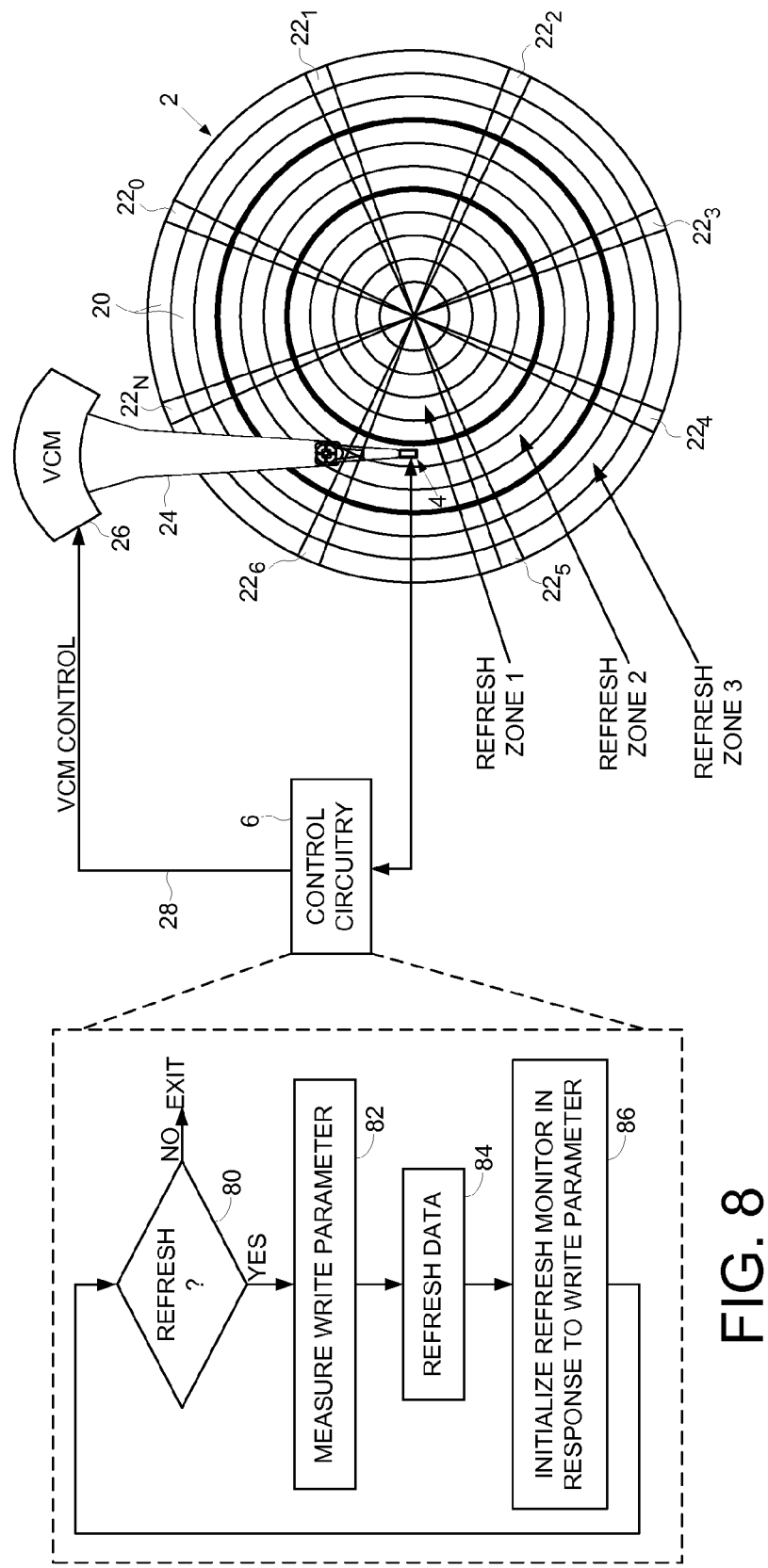
FIG. 8 is a flow diagram according to an embodiment of the present invention wherein the refresh monitor is initialized in response to a write operation quality parameter.

FIG. 8 is a flow diagram according to another embodiment of the present invention that may be executed by the control circuitry 6 to initialize the refresh monitor relative to the write operation quality parameter. If at step 80 the refresh monitor indicates a refresh operation needs to be performed, at step 82 a write operation quality parameter (e.g., temperature) is measured, and at step 84 the data is refreshed. At step 86 the refresh monitor is initialized in response to the write operation quality parameter measured at step 82. For example, if the ambient temperature is high during the refresh operation, indicating that the data was rewritten with lower coercivity, the refresh monitor is initialized to shorten the next refresh interval. The refresh monitor may be initialized in any suitable manner, such as adjusting the threshold 42 in FIG. 2A, or by adjusting the frequency signal 52 of FIG. 5A, or by adjusting one or more of the update functions 30, 58, and 60 in FIG. 6B.

Any suitable control circuitry 6 may be employed in the embodiments of the present invention, such as any suitable integrated circuit or circuits. For example, the control circuitry 6 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 6 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in an SOC. In another embodiment, the instructions are stored on the disk 2 and read into a volatile semiconductor memory when the disk drive is powered on. In yet another embodiment, the control circuitry 6 comprises suitable logic circuitry, such as state machine circuitry.

What is claimed is:

1. A disk drive comprising:
    a disk;
    a head actuated over the disk;
    control circuitry operable to:
        receive a write operation for a refresh zone of the disk;
        measure a write operation quality parameter that affects the quality of the write operation during the write operation;
        perform the write operation;
        enable an update function in connection with performing the write operation, wherein the update function is operable to update a refresh monitor as a function of the write operation and the write operation quality parameter; and
        refresh data stored in the refresh zone of the disk in response to the refresh monitor.

2. The disk drive as recited in claim 1, wherein the write operation quality parameter comprises an ambient temperature.

3. The disk drive as recited in claim 1, wherein the write operation quality parameter comprises at least one of an ambient temperature, altitude, a fly-height heater parameter, a write current amplitude, a write current overshoot, a skew angle of the head, a width of the head, a data density of data recorded on the disk, and a servo parameter.

4. The disk drive as recited in claim 1, wherein:
    the control circuitry is further operable to measure a plurality of write operation quality parameters that affect the quality of the write operation; and
    the update function is operable to update the refresh monitor as a function of the write operation and the plurality of write operation quality parameters.

5. The disk drive as recited in claim 1, wherein the update function is operable to update the refresh monitor as a function of the write operation, the write operation quality parameter, and a duration of the data stored in the refresh zone.

6. The disk drive as recited in claim 5, wherein the update function is further operable to update the refresh monitor as a function of an ambient temperature over the duration of the data stored in the refresh zone.

7. The disk drive as recited in claim 5, wherein:
    the write operation quality parameter comprises an ambient temperature at the time of the write operation; and
    the update function is further operable to update the refresh monitor as a function of an ambient temperature over the duration of the data stored in the refresh zone.

8. A method of operating a disk drive, the disk drive comprising a disk, and a head actuated over the disk, the method comprising:
    receiving a write operation for a refresh zone of the disk;
    measuring a write operation quality parameter that affects the quality of the write operation during the write operation;
    performing the write operation;
    enabling an update function in connection with performing the write operation, wherein the update function is operable to update a refresh monitor as a function of the write operation and the write operation quality parameter; and
    refreshing data stored in the refresh zone of the disk in response to the refresh monitor.

9. The method as recited in claim 8, wherein the write operation quality parameter comprises an ambient temperature.

10. The method as recited in claim 8, wherein the write operation quality parameter comprises at least one of an ambient temperature, altitude, a fly-height heater parameter, a write current amplitude, a write current overshoot, a skew angle of the head, a width of the head, a data density of data recorded on the disk, and a servo parameter.

11. The method as recited in claim 8, further comprising measuring a plurality of write operation quality parameters that affect the quality of the write operation, wherein the update function is operable to update the refresh monitor as a function of the write operation and the plurality of write operation quality parameters.

12. The method as recited in claim 8, wherein the update function is operable to update the refresh monitor as a function of the write operation, the write operation quality parameter, and a duration of the data stored in the refresh zone.

13. The method as recited in claim 12, wherein the update function is further operable to update the refresh monitor as a function of an ambient temperature over the duration of the data stored in the refresh zone.

14. The method as recited in claim 12, wherein:
    the write operation quality parameter comprises an ambient temperature at the time of the write operation; and
    the update function is further operable to update the refresh monitor as a function of an ambient temperature over the duration of the data stored in the refresh zone.

* * * * *